(12) United States Patent
Gehrer

(10) Patent No.: US 10,547,459 B2
(45) Date of Patent: Jan. 28, 2020

(54) METHOD FOR GENERATING A CRYPTOGRAPHIC KEY IN A SYSTEM-ON-A-CHIP

(71) Applicant: Robert Bosch GmbH, Stuttgart (DE)

(72) Inventor: Stefan Gehrer, Erfurt (DE)

(73) Assignee: Robert Bosch GmbH, Stuttgart (DE)

( * ) Notice: Subject to any disclaimer, the term of this patent is extended or adjusted under 35 U.S.C. 154(b) by 246 days.

(21) Appl. No.: 14/844,798

(22) Filed: Sep. 3, 2015

(65) Prior Publication Data

US 2016/0080158 A1 Mar. 17, 2016

(30) Foreign Application Priority Data

Sep. 11, 2014 (DE) .................. 10 2014 218 218

(51) Int. Cl.
*H04L 9/08* (2006.01)
*H04L 9/32* (2006.01)

(52) U.S. Cl.
CPC .................. *H04L 9/3278* (2013.01)

(58) Field of Classification Search
CPC ..... G09C 1/00; H04L 2209/12; H04L 9/0866; H04L 9/3278
See application file for complete search history.

(56) References Cited

U.S. PATENT DOCUMENTS

| 4,251,885 | A  | * | 2/1981  | Dodt       | G05B 19/058   |
|           |    |   |         |            | 714/50        |
| 2003/0034848 | A1 | * | 2/2003  | Norman     | H03K 3/011    |
|           |    |   |         |            | 331/46        |
| 2009/0132821 | A1 | * | 5/2009  | Matsuzaki  | H04L 9/0877   |
|           |    |   |         |            | 713/170       |
| 2011/0121838 | A1 | * | 5/2011  | Gillis     | G01R 31/318544|
|           |    |   |         |            | 324/537       |
| 2011/0243064 | A1 | * | 10/2011 | McManus    | H04W 88/16    |
|           |    |   |         |            | 370/328       |
| 2013/0051552 | A1 | * | 2/2013  | Handschuh  | G06F 21/602   |
|           |    |   |         |            | 380/44        |
| 2014/0016776 | A1 | * | 1/2014  | Van Foreest| G06F 21/72    |
|           |    |   |         |            | 380/46        |
| 2014/0225639 | A1 | * | 8/2014  | Guo        | H03K 3/84     |
|           |    |   |         |            | 326/8         |
| 2015/0012737 | A1 | * | 1/2015  | Newell     | G06F 21/575   |
|           |    |   |         |            | 713/2         |

\* cited by examiner

*Primary Examiner* — Joseph P Hirl
*Assistant Examiner* — Sayed Aresh Beheshti Shirazi
(74) *Attorney, Agent, or Firm* — Norton Rose Fulbright US LLP; Gerard Messina

(57) ABSTRACT

In a method for generating a cryptographic key in a system-on-a-chip having a hardware-programmable logic unit, a circuit region of the hardware-programmable logic unit is configured in such a way that a first physical unclonable function is executed in the circuit region in order to generate a first cryptographic key, and the circuit region is reconfigured in such a way that (i) a further physical unclonable function is executed in order to generate a further cryptographic key or (ii) another functionality that does not encompass a physical unclonable function is executed.

9 Claims, 2 Drawing Sheets

METHOD FOR GENERATING A CRYPTOGRAPHIC KEY IN A SYSTEM-ON-A-CHIP

BACKGROUND OF THE INVENTION

1. Field of the Invention

The present invention relates to a method for generating a cryptographic key in a system-on-a-chip having a hardware-programmable logic unit.

2. Description of the Related Art

A single-chip system or system-on-a-chip (SoC) is an integrated circuit (IC) in which a plurality of functions of a corresponding system are integrated onto a single chip (die). SoCs of this kind can encompass, for example, a hardware-programmable logic unit (programmable logic section, PL) and a processor unit (processor system section, PS).

A processor unit of this kind can encompass an appropriate processor or processor core, or a multicore processor. Multicore processors encompasses multiple (at least two) processor cores. A processor core usually encompasses an arithmetic logic unit (ALU) that represents the actual electronic calculation mechanism for executing tasks, programs, calculation instructions, etc., and also a local memory.

The hardware of a hardware-programmable logic unit is not unchangeable, but instead can be modified at any time. Hardware-programmable logic units can usually be reprogrammed or reconfigured on the hardware level using a hardware description language (HDL). Different functionalities can thereby be assigned to a hardware-programmable logic unit. In order to reconfigure a hardware-programmable logic unit, individual circuit regions of the hardware-programmable logic unit can be differently interconnected. A configuration of hardware elements (e.g. lookup tables (LUT), multiplexers (MUX), interconnections between logic instances (e.g. programmable interconnect points) and/or global resources such as a clock, Vcc, GND) in the individual circuit regions can be modified in this context. Hardware-programmable logic units of this kind can be embodied in particular as so-called field programmable gate arrays (FPGAs).

Cryptographic keys for encoding data or for secure exchange of data or secure communication among different calculation units can be generated using a so-called physical unclonable function (PUF). When a physical unclonable function (PUF) of this kind is embodied in a particular SoC, a cryptographic key that is characteristic of that particular SoC can be generated.

Physical unclonable functions (PUFs) of this kind are functions that are based on physical characteristics of the SoC. A PUF, for example, evaluates production fluctuations in a chip or in the SoC, and generates an individual chip signal therefrom. An individual chip signal of this kind is a result of the PUF executed on the SoC. This individual chip signal varies greatly between different chips or between different SoCs. This individual chip signal can generally be used to authenticate the SoC or to generate (cryptographic) keys.

Implementing a PUF in an SoC usually entails considerable complexity and high cost. Usually a specific circuit region of the hardware-programmable logic unit of the SoC can be reserved for the PUF and correspondingly configured. A plurality of hardware resources of the hardware-programmable logic unit can usually be interconnected for this purpose.

The circuit region can usually be used exclusively for this particular PUF. The result, however, is that a large proportion of the hardware-programmable logic unit of the SoC, which is used exclusively for this particular PUF, is lost. Hardware resources of the SoC therefore cannot be exploited to their full extent.

It is therefore desirable to furnish an improved capability for generating cryptographic keys in a system-on-a-chip having a hardware-programmable logic unit.

BRIEF SUMMARY OF THE INVENTION

The present invention proposes a method for generating a cryptographic key in a system-on-a-chip. The system-on-a-chip (SoC) has a hardware-programmable logic unit (programmable logic section, PL). The hardware-programmable logic unit is embodied in particular as a field programmable gate array (FPGA). The hardware-programmable logic unit has a circuit region that can be reconfigured or modified. This circuit region encompasses, in particular, multiple configurable logic blocks (CLBs). These configurable logic blocks each encompass various hardware elements such as lookup tables (LUT), multiplexers (MUX), and/or flip-flop circuits. The hardware-programmable logic unit can in particular encompass multiple such circuit regions. In particular, individual ones of the configurable logical blocks become reconfigured in the course of configuration of the circuit region.

The SoC furthermore has, in particular, a processor unit (processor system section, PS). The processor unit encompasses in particular an appropriate processor core or an appropriate multicore processor made up of several (at least two) processor cores. The SoC furthermore encompasses an internal (small) nonvolatile memory region (fuse). This memory region (fuse) is, in particular, programmable only once.

The circuit region of the hardware-programmable logic unit is configured in such a way that this circuit region can execute a first physical unclonable function (PUF) in order to generate a first cryptographic key. In particular, individual configurable logic blocks of the circuit region are correspondingly configured to execute the first physical unclonable function (PUF). Once this first PUF is executed in the circuit region, and once the first cryptographic key has been generated, the circuit region is reconfigured. The circuit region can on the one hand be reconfigured in such a way that a further PUF can be executed in order to generate a further cryptographic key. On the other hand, the circuit region can be reconfigured in such a way that another functionality can be executed. "Another functionality" is to be understood as an appropriate functionality that does not encompass a physical unclonable function.

If the circuit region is reconfigured in such a way that a further PUF can be executed, the circuit region can be reconfigured again after that respective PUF is executed, either in order to execute once again a further PUF for generating a further cryptographic key, or in order to execute another functionality. Once a PUF has been executed and a corresponding key has been generated, an evaluation is made in particular as to whether the circuit region is to execute a further PUF or whether the circuit region is to be used for another functionality.

The hardware-programmable logic unit has in particular an appropriate number of circuit regions. The invention is suitable in particular for each of these different circuit regions. Be it noted at this juncture that the description that follows is directed especially to "a" or "the" circuit region.

The description that follows is to apply analogously, however, to all circuit regions of the hardware-programmable logic unit.

The circuit region is correspondingly configured in particular by the processor unit. The processor unit has, in particular, unrestricted access to the hardware-programmable logic unit and can configure all the circuit regions.

The invention makes it unnecessary to reserve a particular circuit region for execution of a particular PUF and to use it exclusively therefor. Each circuit region can be used for different PUFs. In addition, after execution of a PUF another functionality can also be executed in the respective circuit region in the course of regular operation of the SoC.

Once the first PUF has been executed in the respective circuit region, the circuit region of the hardware-programmable logic unit does not remain unmodified and unused, but instead according to the present invention is reconfigured and is used for further functionalities. The reconfiguration capability can be used for the respective circuit region of the hardware-programmable logic unit. Hardware resources of the SoC can thus be utilized flexibly and appropriately, and exploited to their full extent. In particular, different PUFs can be executed successively in the circuit region. In addition, PUFs and other functionalities can also be executed in the circuit region alternately or as needed.

The invention makes it possible to execute an appropriate number of different PUFs in different or the same circuit regions of the SoC. It is thus not necessary to execute a single PUF in a specific circuit region. Hardware resources of the hardware-programmable logic unit that are required for generation of a cryptographic key of a predefined length can thus be reduced as compared with conventional methods for generating a cryptographic key of the same predefined length.

Assurance is nevertheless provided that a cryptographic key having the greatest possible security can be generated. The cryptographic key generated by way of the PUF executed in the circuit region is unique to the SoC, very difficult or almost impossible to predict, intrinsic, and cannot be monitored (in particular, not by a manufacture of the SoC). A cryptographic key of this kind that is generated by way of a PUF is very difficult or impossible to generate by reconstruction or reverse engineering. The result is essentially to preclude the possibility of an attacker reconstructing this cryptographic key and carrying out a malicious attack on the SoC.

According to a preferred embodiment of the invention, the circuit region is reconfigured in such a way that a respective further physical unclonable function for generating a respective further cryptographic key can be executed, until a specific number of cryptographic keys is generated. In each step, the circuit region is respectively reconfigured, the corresponding further physical unclonable function is respectively executed, and a corresponding further cryptographic key is respectively generated. Different cryptographic keys are thus generated, by way of different PUFs, until the specific number of cryptographic keys is reached. Preferably the circuit region is used for another functionality when the specific number of cryptographic keys is generated.

Advantageously, the cryptographic keys generated in the circuit region are each generated as a partial cryptographic key. These different partial cryptographic keys are assembled into a complete cryptographic key. In contrast to conventional methods, a complete cryptographic key is therefore not generated by a single PUF implementation. Instead, the complete cryptographic key is generated from a plurality of different partial cryptographic keys, using a plurality of different PUF implementations. In particular, the complete cryptographic key is assembled from the specific number, explained above, of cryptographic keys. PUFs of this kind, which each generate a partial cryptographic key, are simpler and more space-saving to implement than a single PUF that generates a complete cryptographic key. It is therefore possible to prevent a large proportion of the hardware-programmable logic unit from being lost in order to implement a PUF of this kind for generating a complete cryptographic key.

Preferably the cryptographic keys generated in the circuit region are stored in a memory unit in the system-on-a-chip. The memory unit is embodied in particular as a volatile memory unit, for example as SRAM. In particular, the cryptographic keys that have been generated are stored in the internal volatile memory region of the SoC. Preferably the partial cryptographic keys are stored in the memory unit and are assembled there into the complete cryptographic key.

According to an advantageous embodiment of the invention, the circuit region is configured to execute the respective physical unclonable function by respectively interconnecting two lookup tables (LUT) and one flip-flop circuit. One of the lookup tables is configured in particular as a NAND gate. The other lookup table is configured in particular as an inverter and is interconnected with the flip-flop circuit, and together therewith forms a so-called toggle flip-flop or T flip-flop. These interconnections are carried out in particular by way of switching elements of the circuit region, for example multiplexers (MUX). Respectively different lookup tables and flip-flop circuits are appropriately interconnected with one another in order to implement different PUFs in the circuit region.

When the respective physical unclonable function is executed in accordance with the corresponding connection pattern in the circuit region, a chip signal that is individual for the SoC is generated. This chip signal has an output frequency. The respective PUF evaluates, in particular, production fluctuations in the SoC and generates the individual chip signal therefrom. The individual chip signal is very difficult or impossible to generate by reconstruction or reverse engineering. This individual chip signal represents a metaphorical "fingerprint" of the SoC, and uniquely characterizes the SoC. The SoC can, in particular, be authenticated on the basis of this individual chip signal. The individual chip signal can furthermore be used to generate the respective cryptographic key.

When an "enable signal" that is delivered to the NAND gate of a particular PUF is set to the value "0", the NAND gate becomes deactivated. Otherwise the output of the NAND gate is delivered in turn to the gate as an input. This results in an oscillation of the output of the NAND gate. The frequency of this oscillation is, in particular, comparatively high. This frequency can be decreased, in particular halved, by way of the T flip-flop. This decreased frequency represents, in particular, the output frequency of the chip signal.

Preferably the first physical unclonable function is executed in a first configurable logic block of the circuit region and in a second configurable logic block of the circuit region. Execution of the first PUF in the first configurable logic block causes generation of a first signal or first chip signal having a first frequency. Execution of the first PUF in the second configurable logic block causes generation of a second signal or second chip signal having a second frequency.

The first and the second configurable logic block are accordingly of correspondingly identical configuration and execute the same PUF. As a result of production fluctuations between the first and the second circuit region, however, the first and the second chip signal can be different, and the first and the second frequency can differ from one another. The first and the second frequency are compared with one another. The result of this comparison can be used to generate the first cryptographic key.

In particular, a bit having a specific value is generated in the course of this comparison. If the first frequency is greater than the second frequency, for example, a bit having the value "1" is generated. Otherwise, for example, a bit having the value "0" is generated. Such bits can be used to authenticate the SoC or to generate the cryptographic key.

The first and the second configurable logic block are, in particular, disposed adjacently in the circuit region and are contiguous with one another. It is thereby possible to prevent the first and the second frequency from being falsified due to a difference in position on the hardware-programmable logic unit.

Once the first and the second chip signal have been generated and their frequencies compared with one another, a respective further PUF is executed analogously in the first and the second configurable logic block. A further first signal having a further first frequency is thus generated in the first configurable logic block, and a further second signal having a further second frequency is generated in the second configurable logic block. This further first frequency and further second frequency are compared with one another, analogously to the description above. The result of this comparison is used to generate a corresponding further cryptographic key.

Preferably, further PUFs are executed in the first and the second configurable logic block, further comparisons of corresponding frequencies are carried out, and further cryptographic keys are analogously generated, until a specific number of cryptographic keys is generated. This specific number of cryptographic keys corresponds, in particular, to the specific number of cryptographic keys that was explained above.

In particular, a bit having a specific value is respectively generated in the course of these comparisons, in accordance with the explanation above. Each of these bits furthermore represents, in particular, a partial cryptographic key, these being assembled into the complete cryptographic key. The specific number N of these partial cryptographic keys is accordingly assembled, in particular, into an N-bit complete cryptographic key.

Alternatively or additionally, the first PUF implementation can also be executed in a plurality of different configurable logic blocks of the circuit regions. The first PUF implementation is executed, in particular, in a plurality of different pairs of configurable logic blocks. The configurable logic blocks of these different pairs are, in particular, each adjacent or contiguous to one another. Executing the first PUF in the different pairs of configurable logic blocks causes respective generation of a first and a second chip signal having a respective first and second frequency. These frequencies are respectively compared with one another and used to generate a corresponding cryptographic key. In particular, the first PUF is implemented in different pairs of configurable logic blocks a sufficient number of times to generate the specific number of M bits of a partial cryptographic key. The specific number N of these M-bit cryptographic keys is accordingly assembled, in particular, into an M*N-bit complete cryptographic key.

According to a preferred embodiment of the invention, the method for generating cryptographic keys is carried out in the course of a starting or initializing process of the system-on-a-chip. The SoC is, in the course thereof, in particular started or "booted" from a deactivated operating mode. In the course of this type of starting or initializing process of the SoC, in particular firstly the programmable logic section (PL), i.e. the hardware-programmable logic unit, and the processor system section (PS), i.e. the processor unit, are initialized. The starting or initializing process is executed in particular as a "secure boot" process. The starting or initializing process is accordingly carried out in particular by a signed bootloader, with the result that malicious software or other undesired programs and program modifications are prevented at startup.

In particular, all the cryptographic keys that are required during regular operation of the SoC are generated in the course of the starting or initializing process. Thanks to the invention, the circuit regions in which the cryptographic keys are generated in the course of the starting or initializing process can also be used during regular operation of the SoC for other functionalities.

The invention is suitable, for example, for SoCs that are embodied as part of a microcontroller or control unit for controlling machines or facilities, or in consumer electronics, e.g. in mobile telephones or television sets. The invention is suitable in particular for use in automotive applications, in particular for motor vehicles or commercial vehicles. The SoC can be embodied, for example, as part of an engine control unit of an internal combustion engine of a motor vehicle. The purpose of such an engine control unit is, for example, to calculate output variables for actuators (such as an injection nozzle or ignition system) from a plurality of input signals (e.g. engine speed, temperature, or pressure).

In control units of this kind, for example in a motor vehicle, the SoC communicates with other components of the control unit or with other control units of the motor vehicle. The data that are exchanged among these individual components of the control unit can encompass, for example, particular control application instructions, technical data, control values, or parameters. In order for the data to be exchanged, they are in particular encoded and decoded using cryptographic keys that have been generated in the course of a preferred embodiment of the invention.

Such data, instructions, or values have been identified and optimized by the manufacturer, in development processes often lasting years, with a great deal of research outlay involving complex long-term testing programs. It is thus in the manufacturer's interest to keep these data from being read by a third party (an attacker) in order to ensure "know-how" protection.

The invention can thus prevent attacks on a control unit of this kind, and can ensure know-how protection. The securing of the SoC according to the present invention can furthermore also, for example, prevent frivolous "chip tuning" in motor vehicles. "Chip tuning" involves modifying control parameters of the control unit in order to bring about performance increase. This can result in component damage and environmental pollution, and even in personal injury, since the entire design of the vehicle (drive train, braking system) can be negatively affected.

A calculation unit according to the present invention, e.g. a system-on-a-chip or a control unit of a motor vehicle, is configured, in particular in terms of program engineering, to carry out a method according to the present invention.

Implementation of the method in the form of software is also advantageous, since this entails particularly low costs, in particular when an executing control unit is also used for other purposes and is therefore present in any case. Suitable data media for furnishing the computer program are, in particular, diskettes, hard drives, flash memories, EEPROMs, CD-ROMs, DVDs, and many others. Downloading of a program via computer networks (internet, intranet, etc.) is also possible.

Further advantages and embodiments of the invention are evident from the description and the attached drawings.

It is understood that the features recited above and those yet to be explained below are usable not only in the respective combination indicated, but also in other combinations or in isolation, without departing from the scope of the present invention.

The invention is schematically depicted in the drawings on the basis of exemplifying embodiments, and will be described in detail below with reference to the drawings.

DETAILED DESCRIPTION OF THE INVENTION

Figure 1:
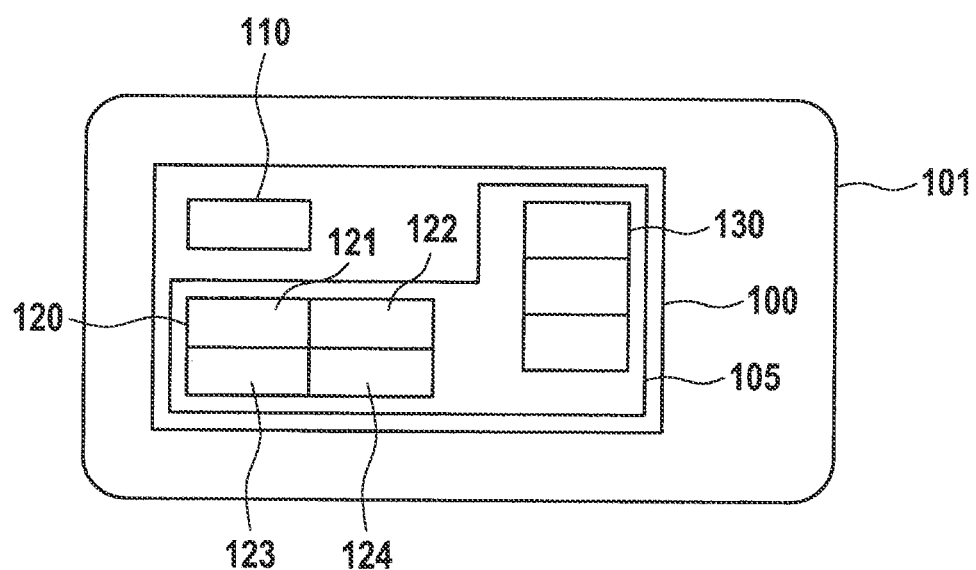
FIG. 1 schematically shows a system-on-a-chip that is configured to carry out a preferred embodiment of a method according to the present invention.

FIG. 1 schematically depicts a system-on-a-chip (SoC) 100 that is configured to carry out a preferred embodiment of a method according to the present invention.

SoC 100 encompasses a processor unit 110 and a hardware-programmable logic unit 105 in the form of a field programmable gate array (FPGA).

FPGA 105 encompasses a plurality of circuit regions that can each be differently interconnected so that respectively different functionalities can be performed. Two circuit regions 120 and 130 are depicted, for example, in FIG. 1.

Circuit region 130 is configured, for example, in such a way that circuit region 130 can be used as a memory unit. Circuit region 120 has a plurality of configurable logic blocks (CLB). Circuit region 120 can have, for example, at least 256 such configurable logic blocks. Four such configurable logic blocks 121 to 124 are depicted, for example, in FIG. 1.

SoC 100 is implemented in particular in a control unit 101 of a motor vehicle, for example in an engine control unit. Cryptographic keys are required for communication among different components of the motor vehicle. These cryptographic keys are generated in the course of a preferred embodiment of the method according to the present invention, in particular in the course of a starting or initializing process when SoC 100 or the corresponding control unit 101 is booted or started.

FIGS. 2a to 2d schematically depict SoC 100 according to FIG. 1 during different steps in the course of this preferred embodiment of the method according to the present invention.

Processor unit 110 in particular executes a program code that is stored in SoC 100 or is loaded from an external source. SoC 100 preferably is configured in terms of program engineering in such a way that it executes only program code that is signed with a private key, to which SoC 100 possesses a public key. The public key(s) is/are stored in particular in a memory region that can be written to only once, so that attacks on SoC 100 also cannot be effected by that route. Permissible public keys are usefully stored, by the manufacturer of the control unit or of the motor vehicle, in the memory region that can be written to only once.

Figure 2A:
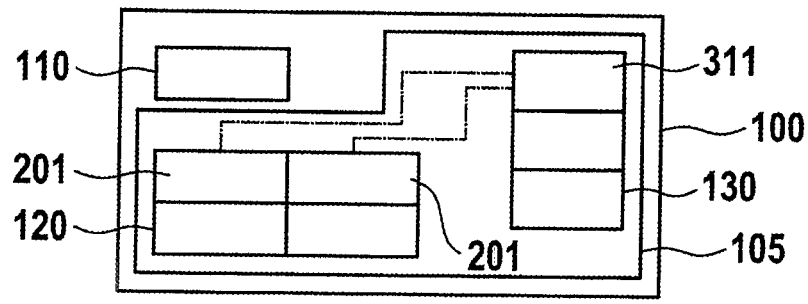
FIG. 2A schematically shows the system-on-a chip of FIG. 1 during different steps in the course of a preferred embodiment of a method according to the present invention.

In FIG. 2a, processor unit 110 configures circuit region 120 of FPGA 105 to execute a first physical unclonable function (PUF). For this purpose, processor unit 110 configures configurable logic blocks 121 and 122 of circuit region 120 to respectively execute the first PUF 201.

First PUF 201 is executed in configurable logic block 121, with the result that a first chip signal having a first frequency is generated. First PUF 201 is furthermore executed in configurable logic block 122, with the result that a second chip signal having a second frequency is generated. The first and the second frequency are compared with one another. In the course of this comparison, a bit 311 having a specific value is generated. For example, if the first frequency is greater than the second frequency, bit 311 assumes, for example, the value "1". Otherwise bit 311 assumes the value "0".

This bit 311 is generated as a first partial cryptographic key. Bit 311 is stored in circuit region 130, configured as a memory unit, of FPGA 105. Circuit region 130 of FPGA 105 is used in this example as an internal key memory.

Figure 2B:
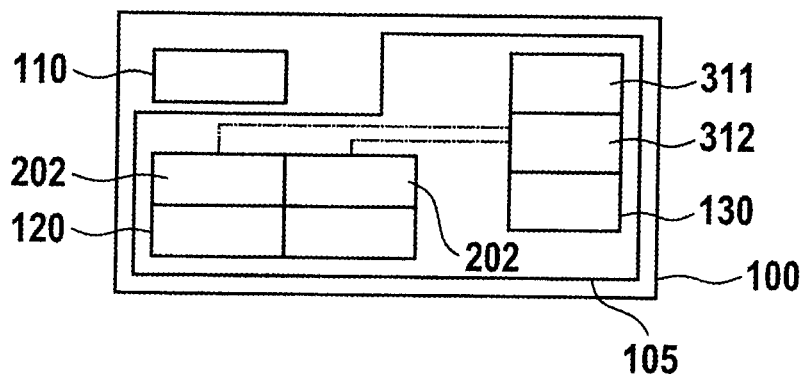
FIG. 2B schematically shows the system-on-a chip of FIG. 1 during different steps in the course of a preferred embodiment of a method according to the present invention.

In FIG. 2b, processor unit 110 reconfigures circuit region 120 of FPGA 105 in order to execute a second PUF 202. For this purpose, processor unit 110 configures configurable logic blocks 121 and 122 of circuit region 120 to respectively execute second PUF 201. This second PUF 202 is executed in both configurable logic blocks 121 and 122, the result once again being to generate two chip signals whose frequencies are compared with one another. In the course of this comparison, a second bit 312 is generated as a second partial cryptographic key and is stored in internal key memory 130.

Figure 2C:
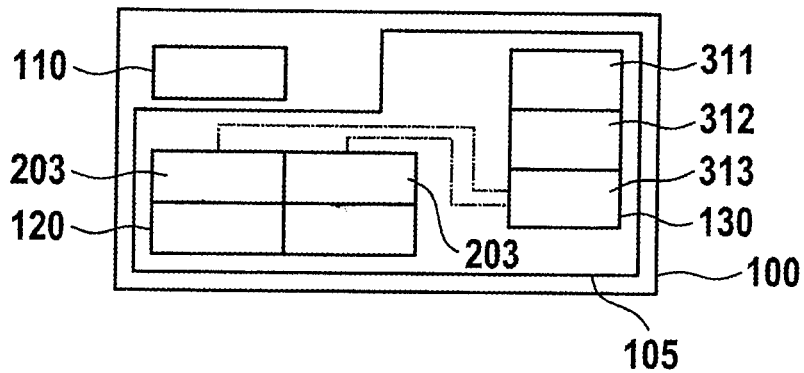
FIG. 2C schematically shows the system-on-a chip of FIG. 1 during different steps in the course of a preferred embodiment of a method according to the present invention.

In FIG. 2c, processor unit 110 analogously reconfigures circuit region 120 in order to execute a third PUF 203. For this purpose, processor unit 110 analogously reconfigures configurable logic blocks 121 and 122 to respectively execute third PUF 203. Once again, two chip signals are accordingly generated and their frequencies are compared with one another. In the course of this comparison, a third bit 313 is generated as a third partial cryptographic key and is stored in internal key memory 130.

These three bits 311, 312, 313 are assembled, in flash memory 130, into a 3-bit complete cryptographic key.

Figure 2D:
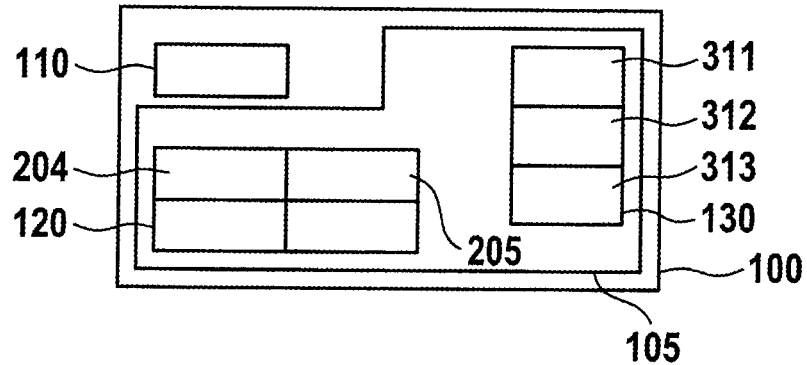
FIG. 2D schematically shows the system-on-a chip of FIG. 1 during different steps in the course of a preferred embodiment of a method according to the present invention.

In FIG. 2d, processor unit 110 reconfigures configurable logic blocks 121 and 122, and thus circuit region 120 of FPGA 105, to respectively execute another functionality 204, 205.

This reconfiguration of configurable logic blocks 121 and 122 can be carried out repeatedly until an appropriate number of bits has been generated, for example at least 128 bits.

Instead of configurable logic blocks 121 and 122, other pairs of configurable logic blocks of circuit region 120 can also be respectively reconfigured in order to generate a respective bit. Circuit region 120 encompasses, in particular, a number of configurable logic blocks at least sufficient that the number thereof, multiplied by the number of reconfigured PUFs according to 201, 202, 203, etc., is enough to generate a total of at least 128 bits.

What is claimed is:

1. A method for generating a cryptographic key in a system-on-a-chip having a hardware-programmable logic unit, the hardware-programmable logic unit having a circuit region with a plurality of hardware programmable logic blocks, the method comprising:
    configuring, via a processor, a first configurable logic block of the plurality of hardware programmable logic blocks to execute a first Physical Unclonable Function (PUF);
    configuring, via the processor, a second configurable logic block of the plurality of hardware programmable logic blocks identically to the configuration of the first configurable logic block to execute the first PUF;
    executing the first PUF in the first configurable logic block, and generating, by the first PUF executing in the first configurable logic block, a first signal having a first frequency;
    executing the first PUF in the second configurable logic block, and generating, by the first PUF executing in the second configurable logic block, a second signal having a second frequency, wherein the first PUF executed in the first configurable logic block is the same PUF as the first PUF executed in the second configurable logic block;
    comparing the first frequency to the second frequency, wherein any difference between the first frequency and the second frequency results from production fluctuations between the first configurable logic block, and the second configurable logic block;
    determining a first cryptographic key based on results of the comparing;
    after the executing of the first PUF in at least one of the first configurable logic block and second configurable logic block, reconfiguring, via the processor, the at least one of the first configurable logic block and the second configurable logic block, to execute one of (i) at least one further PUF different from the first PUF, the at least one further PUF being executed to generate at least one further cryptographic key or (ii) another functionality which does not include a PUF, which is executed;
    wherein the processor has unrestricted access to the hardware-programmable logic unit to configure and reconfigure any of the plurality of hardware programmable logic blocks, and
    wherein the first configurable logic block and the second configurable logic block are disposed adjacently to each other in the circuit region and are contiguous with one another, to prevent the first frequency and the second frequency from being falsified due to a difference in position on the hardware-programmable logic unit;
    wherein:
        the first configurable logic block and the second configurable logic block are consecutively reconfigured a selected number of times greater than one to execute a specified number greater than one of further PUFs to generate a specified number greater than one of further cryptographic keys;
        the specified number of further physical unclonable functions are executed in the first configurable logic block and the second configurable logic block; and
        the specified number of further cryptographic keys are generated.

2. The method as recited in claim 1, wherein, when the first cryptographic key and the specified number of further cryptographic keys have been generated, the first configurable logic block and the second configurable logic block are reconfigured so that the another functionality which does not include a PUF is able to be executed, and wherein the another functionality which does not include a PUF is executed in the first configurable logic block and the second configurable logic block.

3. The method as recited in claim 1, wherein each of the first cryptographic key and the specified number of further cryptographic keys is generated in the first configurable logic block and the second configurable logic block as a partial cryptographic key, and wherein the partial cryptographic keys are subsequently assembled together into a complete cryptographic key.

4. The method as recited in claim 1, wherein the specified number of further cryptographic keys generated in the first configurable logic block and the second configurable logic block are stored in a memory unit in the system-on-a-chip.

5. The method as recited in claim 1, wherein at least one of the configuring and the reconfiguring of the first configurable logic block and the second configurable logic block is achieved by interconnecting two lookup tables and one flip-flop circuit.

6. The method as recited in claim 1, wherein the method is performed in the course of an initializing process of the system-on-a-chip.

7. A method for generating a cryptographic key in a system-on-a-chip having a hardware-programmable logic unit, the hardware-programmable logic unit having a circuit region with a plurality of hardware programmable logic blocks, the method comprising:
    configuring, via a processor, a first configurable logic block of the plurality of hardware programmable logic blocks to execute a first Physical Unclonable Function (PUF);
    configuring, via the processor, a second configurable logic block of the plurality of hardware programmable logic blocks identically to the configuration of the first configurable logic block to execute the first PUF;
    executing the first PUF in the first configurable logic block, and generating, by the first PUF executing in the first configurable logic block, a first signal having a first frequency;
    executing the first PUF in the second configurable logic block, and generating, by the first PUF executing in the second configurable logic block, a second signal having a second frequency, wherein the first PUF executed in the first configurable logic block is the same PUF as the first PUF executed in the second configurable logic block;
    comparing the first frequency to the second frequency, wherein any difference between the first frequency and the second frequency results from production fluctuations between the first configurable logic block, and the second configurable logic block;
    determining a first cryptographic key based on results of the comparing;
    after the executing of the first PUF in at least one of the first configurable logic block and second configurable logic block, reconfiguring, via the processor, the at least one of the first configurable logic block and the second configurable logic block, to execute one of (i) at least one further PUF different from the first PUF, the at least one further PUF being executed to generate at least one further cryptographic key or (ii) another functionality which does not include a PUF, which is executed;

wherein the processor has unrestricted access to the hardware-programmable logic unit to configure and reconfigure any of the plurality of hardware programmable logic blocks, and wherein the first configurable logic block and the second configurable logic block are disposed adjacently to each other in the circuit region and are contiguous with one another, to prevent the first frequency and the second frequency from being falsified due to a difference in position on the hardware-programmable logic unit;

wherein:

after the first PUF is executed in the first configurable logic block, the first configurable logic block is reconfigured so that the at least one further PUF is able to be executed, the at least one further PUF being executed in the first configurable logic block to generate a further first signal having a further first frequency;

after the first PUF is executed in the second configurable logic block, the second configurable logic block is reconfigured so that the at least one further PUF is able to be executed, the at least one further PUF being executed in the second configurable logic block to generate a further second signal having a further second frequency; and the further first frequency and the further second frequency are compared with one another, and the at least one further cryptographic key is generated based on the comparison of the further first and second frequencies.

8. A control unit, comprising:

a system-on-a chip having a processor and a hardware-programmable logic unit, the hardware-programmable logic unit having a circuit region with a plurality of hardware programmable logic blocks, wherein:

the processor configures a first configurable logic block of the plurality of hardware programmable logic blocks to execute a first Physical Unclonable Function (PUF);

the processor configures a second configurable logic block of the plurality of hardware programmable logic blocks identically to the configuration of the first configurable logic block to execute the first PUF;

the first PUF executes in the first configurable logic block, and the first PUF that executes in the first configurable logic block generates a first signal having a first frequency;

the first PUF executes in the second configurable logic block, and the first PUF that executes in the second configurable logic block generates a second signal having a second frequency, wherein the first PUF executed in the first configurable logic block is the same PUF as the first PUF executed in the second configurable logic block;

the first frequency to the second frequency are compared to one another, wherein any difference between the first frequency and the second frequency results from production fluctuations between the first configurable logic block, and the second configurable logic block;

a first cryptographic key is determined based on results of the comparison;

after the first PUF executes in at least one of the first configurable logic block and the second configurable logic block, the processor reconfigures the at least one of the first configurable logic block and the second configurable logic block, to execute one of (i) at least one further PUF different from the first PUF, the at least one further PUF being executed to generate at least one further cryptographic key or (ii) another functionality which does not include a PUF, which is executed;

wherein the processor has unrestricted access to the hardware-programmable logic unit to configure and reconfigure any of the plurality of hardware programmable logic blocks, and wherein the first configurable logic block and the second configurable logic block are disposed adjacently to each other in the circuit region and are contiguous with one another, to prevent the first frequency and the second frequency from being falsified due to a difference in position on the hardware-programmable logic unit;

wherein:

after the first PUF is executed in the first configurable logic block, the first configurable logic block is reconfigured so that the at least one further PUF is able to be executed, the at least one further PUF being executed in the first configurable logic block to generate a further first signal having a further first frequency;

after the first PUF is executed in the second configurable logic block, the second configurable logic block is reconfigured so that the at least one further PUF is able to be executed, the at least one further PUF being executed in the second configurable logic block to generate a further second signal having a further second frequency; and the further first frequency and the further second frequency are compared with one another, and the at least one further cryptographic key is generated based on the comparison of the further first and second frequencies.

9. A non-transitory, computer-readable data storage medium storing a computer program, the computer program having program code for generating a cryptographic key in a system-on-a chip having a processor and a hardware-programmable logic, the hardware-programmable logic unit having a circuit region with a plurality of hardware programmable logic blocks, the computer program, when executed by a processor, causing the processor to perform:

configuring, via the processor, a first configurable logic block of the plurality of hardware programmable logic blocks to execute a first Physical Unclonable Function (PUF);

configuring, via the processor, a second configurable logic block of the plurality of hardware programmable logic blocks identically to the configuration of the first configurable logic block to execute the first PUF;

executing the first PUF in the first configurable logic block, and generating, by the first PUF executing in the first configurable logic block, a first signal having a first frequency;

executing the first PUF in the second configurable logic block, and generating, by the first PUF executing in the second configurable logic block, a second signal having a second frequency, wherein the first PUF executed in the first configurable logic block is the same PUF as the first PUF executed in the second configurable logic block;

comparing the first frequency to the second frequency, wherein any difference between the first frequency and the second frequency results from production fluctuations between the first configurable logic block, and the second configurable logic block;

determining a first cryptographic key based on results of the comparing;

after the executing of the first PUF in at least one of the first configurable logic block and second configurable logic block, reconfiguring, via the processor, the at least one of the first configurable logic block and the second configurable logic block, to execute one of (i) at least one further PUF different from the first PUF, the at least one further PUF being executed to generate at least one further cryptographic key or (ii) another functionality which does not include a PUF, which is executed;

wherein the processor has unrestricted access to the hardware-programmable logic unit to configure and reconfigure any of the plurality of hardware programmable logic blocks, and wherein the first configurable logic block and the second configurable logic block are disposed adjacently to each other in the circuit region and are contiguous with one another, to prevent the first frequency and the second frequency from being falsified due to a difference in position on the hardware-programmable logic unit;

wherein:
  after the first PUF is executed in the first configurable logic block, the first configurable logic block is reconfigured so that the at least one further PUF is able to be executed, the at least one further PUF being executed in the first configurable logic block to generate a further first signal having a further first frequency;

after the first PUF is executed in the second configurable logic block, the second configurable logic block is reconfigured so that the at least one further PUF is able to be executed, the at least one further PUF being executed in the second configurable logic block to generate a further second signal having a further second frequency; and the further first frequency and the further second frequency are compared with one another, and the at least one further cryptographic key is generated based on the comparison of the further first and second frequencies.

* * * * *